(12) United States Patent
Suzuki et al.

(10) Patent No.: US 8,729,839 B2
(45) Date of Patent: May 20, 2014

(54) DRIVING APPARATUS FOR SENSORLESS FAN MOTOR

(75) Inventors: Toshiya Suzuki, Kyoto (JP); Shinsuke Sano, Kyoto (JP); Atsushi Sato, Kyoto (JP); Eri Kishimoto, Kyoto (JP)

(73) Assignee: Rohm Co., Ltd. (JP)

( * ) Notice: Subject to any disclaimer, the term of this patent is extended or adjusted under 35 U.S.C. 154(b) by 380 days.

(21) Appl. No.: 13/280,980

(22) Filed: Oct. 25, 2011

(65) Prior Publication Data

US 2012/0106072 A1 May 3, 2012

(30) Foreign Application Priority Data

Oct. 29, 2010 (JP) ................................ 2010-243766
Nov. 8, 2010 (JP) ................................ 2010-250013

(51) Int. Cl.
*H02P 6/16* (2006.01)
*H02P 6/20* (2006.01)

(52) U.S. Cl.
USPC ............. 318/400.03; 318/400.11; 318/400.32

(58) Field of Classification Search
CPC ............. H02P 6/16; H02P 6/18; H02P 6/187; H02P 6/20; H02P 6/205
USPC .................. 318/700, 400.01, 400.03, 400.06, 318/400.09, 400.11, 400.32, 400.34, 318/400.35, 400.36
See application file for complete search history.

(56) References Cited

U.S. PATENT DOCUMENTS

| 5,223,772 | A | * | 6/1993 | Carobolante | ............ 318/400.13 |
| 5,726,543 | A | * | 3/1998 | Park et al. | ................ 318/400.11 |
| 7,531,976 | B2 | * | 5/2009 | Fukamizu et al. | ........ 318/400.34 |
| 7,768,226 | B2 | * | 8/2010 | Fukamizu et al. | ............ 318/700 |

FOREIGN PATENT DOCUMENTS

| JP | 2004-104846 A | 4/2004 |
| WO | 2005/083876 A1 | 9/2005 |

* cited by examiner

*Primary Examiner* — Bentsu Ro
(74) *Attorney, Agent, or Firm* — Cantor Colburn LLP (57) ABSTRACT

A BEMF detection circuit generates a rotation detection signal indicating a comparison result between electromotive force voltages $V_U$ through $V_W$ which occur at a terminal of respective multiple coils and an intermediate-point voltage $V_{COM}$. A rotor position detection circuit generates a rotor position detection signal indicating a stopped rotor position An internal start-up synchronization signal generating unit generates a predetermined-frequency forced synchronization signal. Upon receiving a fan motor start-up instruction, a driving signal synthesizing circuit generates a driving control signal based upon the rotor position detection signal. Thus, (1) when back electromotive force voltage occurs, a sensorless driving operation is started based upon the rotation detection signal; (2) when it does not occur, the driving control signal is generated based upon the forced synchronization signal. Subsequently, when it occurs, the sensorless driving operation is started based upon the rotation detection signal.

15 Claims, 9 Drawing Sheets

DRIVING APPARATUS FOR SENSORLESS FAN MOTOR

BACKGROUND OF THE INVENTION

1. Field of the Invention

The present invention relates to a driving technique for a sensorless fan motor, and particularly to a technique for starting up such a sensorless fan motor.

2. Description of the Related Art

With a sensorless motor, back electromotive force does not occur in the stationary state. Accordingly, in this state, the sensorless driving operation of such a sensorless motor cannot be started up based upon back electromotive force. A technique has been proposed in which the rotor position is detected by means of a position detection function for detecting the position of the rotor, and a logic driving signal that corresponds to the detected position is applied to the sensorless motor so as to supply a suitable torque such that the sensorless motor rotates in the normal direction (e.g., Patent documents 1 and 2).

RELATED ART DOCUMENTS

Patent Documents

[Patent Document 1]
Japanese Patent Application Laid Open No. 2004-104846
[Patent Document 2]
International Publication WO 05/083876 pamphlet In order to appropriately detect the position of the rotor using such a method, there is a need to design such a rotor position detection circuit such that it is optimized for the sensorless motor to be driven. That is to say, a driving apparatus designed such that it is optimized for a motor having certain characteristics is not necessarily able to start up other types of motors. There are numerous kinds of sensorless motors used for cooling fans (which will also be referred to as "fan motors" hereafter) as compared with spindle motors used for magnetic disk drives. Furthermore, there is a great difference in the motor characteristics such as the motor rotational speed, motor torque, etc., depending on the device mounting such a fan motor. Accordingly, a driving apparatus for such a fan motor is required to have high versatility. Such a problem leads to difficulty in applying a position detection function to such a fan motor.

SUMMARY OF THE INVENTION

The present invention has been made in view of such a situation. Accordingly, it is an exemplary purpose of an embodiment of the present invention to provide a driving apparatus having high versatility which allows various kinds of sensorless fan motors to be started up.

1. An embodiment of the present invention relates to a driving apparatus for a sensorless fan motor including multiple coils. The driving apparatus comprises: a back electromotive force detection circuit configured to compare, in a state in which the sensorless fan motor is rotating, a back electromotive force voltage that occurs at one terminal of each of the multiple coils with an intermediate-point voltage that occurs at a common connection node at which the multiple coils are connected together, and to generate a rotation detection signal which indicates a comparison result; a rotor position detection circuit configured to detect, in a state in which the sensorless fan motor is stopped, the position of a rotor of the sensorless fan motor, and to generate a rotor position detection signal which indicates the position of the rotor; a forced synchronization signal generating unit configured to generate a forced synchronization signal having a predetermined frequency; a driving signal synthesizing circuit configured to generate a driving control signal for driving the sensorless fan motor; and a driving circuit configured to drive the sensorless fan motor according to the driving control signal. The driving signal synthesizing circuit is configured to generate the driving control signal according to the rotor position detection signal upon reception of an instruction to start up the sensorless fan motor, and thus, (1) when the back electromotive force voltage occurs, the sensorless driving operation is started, in which the driving control signal is generated based upon the rotation detection signal, and (2) when the back electromotive force voltage does not occur, the driving control signal is generated based upon the forced synchronization signal, and following which, when the back electromotive force occurs, a sensorless driving operation is performed in which the driving control signal is generated based upon the rotation detection signal.

With such an embodiment, in a case in which the driving apparatus has failed to start up the sensorless fan motor according to the position detection signal, the forced synchronization driving operation is performed according to the forced synchronization signal. Thus, such an arrangement allows the sensorless fan motor to be rotated in a sure manner, thereby providing improved versatility.

Another embodiment of the present invention relates to a cooling apparatus. The apparatus comprises: a sensorless fan motor; and the aforementioned motor driving apparatus configured to drive the sensorless fan motor.

Yet another embodiment of the present invention relates to an electronic device. The electronic device comprises: a calculation processing apparatus; and the aforementioned cooling apparatus configured to cool the calculation processing apparatus.

2. Another embodiment of the present invention relates to a driving apparatus for a sensorless fan motor including multiple coils. The driving apparatus is configured as a driving apparatus for a sensorless fan motor including multiple coils, and comprises: a frequency setting terminal via which an external capacitor can be connected; a start-up method judgment unit configured to judge whether or not the capacitor is connected to the frequency setting terminal; a start-up synchronization signal generating unit configured to charge and discharge the capacitor in a state in which the capacitor is connected to the frequency setting terminal so as to generate an external forced synchronization signal having a frequency that corresponds to the capacitance of the capacitor; a driving signal synthesizing circuit configured such that, when the start-up method judgment unit detects connection of the capacitor, the driving signal synthesizing circuit generates a driving control signal for starting up the sensorless fan motor based upon the external forced synchronization signal, and when the start-up method judgment unit detects that the capacitor is not connected, the driving signal synthesizing circuit generates the driving control signal based upon a signal that differs from the external forced synchronization signal; and a driving circuit configured to drive the sensorless fan motor according to the driving control signal.

With such an embodiment, in a case in which increased space and increased costs for connecting such a capacitor are allowable, by connecting, to the frequency setting terminal, a capacitor having a capacitance optimized for the sensorless fan motor to be driven, such an arrangement is capable of starting up the fan motor. Alternatively, in a case in which the fan motor can be started up according a signal that differs from the external forced synchronization signal, there is no need to connect such a capacitor, thereby providing a reduced circuit area and reduced costs. That is to say, such an arrangement provides a driving apparatus having improved versatility which is capable of driving various kinds of fan motors.

Another embodiment of the present invention relates to a cooling apparatus. The apparatus comprises: a sensorless fan motor; and the aforementioned motor driving apparatus configured to drive the sensorless fan motor.

Yet another embodiment of the present invention relates to an electronic device. The electronic device comprises: a calculation processing apparatus; and the aforementioned cooling apparatus configured to cool the calculation processing apparatus.

It is to be noted that any arbitrary combination or rearrangement of the above-described structural components and so forth is effective as and encompassed by the present embodiments.

Moreover, this summary of the invention does not necessarily describe all necessary features so that the invention may also be a sub-combination of these described features.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF THE INVENTION

The invention will now be described based on preferred embodiments which do not intend to limit the scope of the present invention but exemplify the invention. All of the features and the combinations thereof described in the embodiment are not necessarily essential to the invention.

In the present specification, the state represented by the phrase "the member A is connected to the member B" includes a state in which the member A is indirectly connected to the member B via another member that does not substantially affect the electric connection therebetween, or that does not damage the functions or effects of the connection therebetween, in addition to a state in which the member A is physically and directly connected to the member B.

Similarly, the state represented by the phrase "the member C is provided between the member A and the member B" includes a state in which the member A is indirectly connected to the member C, or the member B is indirectly connected to the member C via another member that does not substantially affect the electric connection therebetween, or that does not damage the functions or effects of the connection therebetween, in addition to a state in which the member A is directly connected to the member C, or the member B is directly connected to the member C.

Description will be made as an example regarding a fan motor driving apparatus mounted on an electronic computer such as a personal computer, workstation, or the like, and configured to cool a CPU and so forth.

First Embodiment

Figure 1:
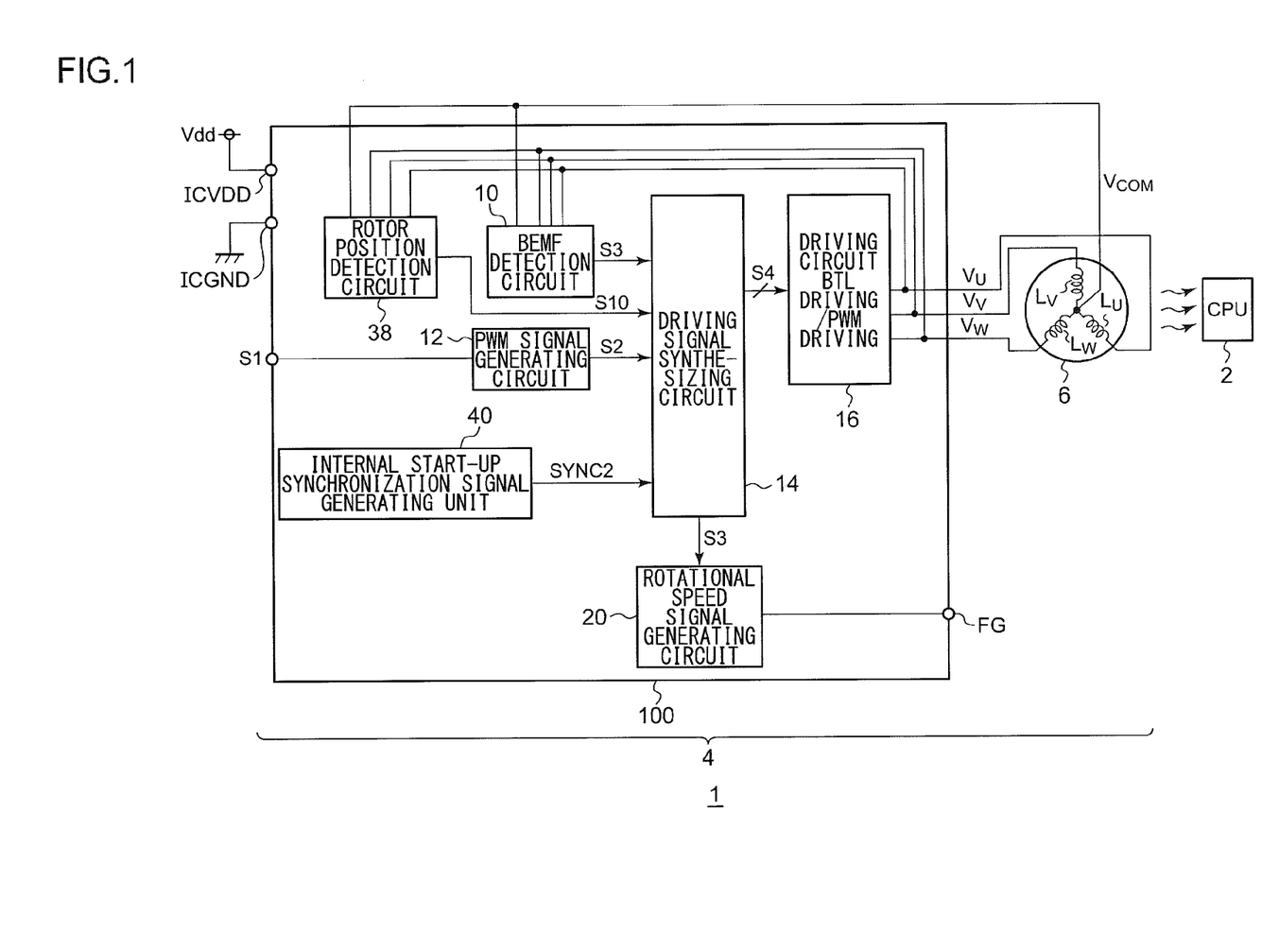
FIG. 1 is a block diagram which shows a configuration of an electronic device including a cooling apparatus according to a first embodiment.

First, description will be made with reference to FIG. 1 regarding the overall configuration of a driving apparatus 100 according to a first embodiment. The driving apparatus 100 is mounted on a cooling apparatus including a sensorless fan motor, and is configured to drive the fan motor. FIG. 1 is a block diagram which shows a configuration of an electronic device 1 including a cooling apparatus 4 according to the embodiment.

The electronic device 1 is configured as a computer such as a personal computer, workstation, etc., or a consumer electronics device such as a refrigerator, TV, etc., and includes a component to be cooled, e.g., a CPU 2. The cooling apparatus 4 is configured to cool the CPU 2 by ventilating it.

The cooling apparatus 4 includes a driving apparatus 100 and a fan motor 6. The fan motor 6 is arranged in the vicinity of the CPU 2 to be cooled. The driving apparatus 100 is configured to drive the fan motor 6 according to an input control signal (which will simply be referred to as the "control signal" hereafter) S1 for indicating the torque (rotational speed) for the fan motor 6. The cooling apparatus 4 is commercially available as a module.

The fan motor 6 is configured as a three-phase AC motor including coils, i.e., a U-phase coil $L_U$, a V-phase coil $L_V$, and an W-phase coil $L_W$, which are star-connected, and an unshown permanent magnet. Description will be made in the present embodiment regarding an arrangement in which the fan motor 6 has four poles.

The driving apparatus 100 is configured as a function IC (Integrated Circuit) integrated on a single semiconductor substrate. The power supply voltage is supplied to a power supply terminal ICVDD, and the ground voltage is supplied to a ground terminal ICGND.

The driving apparatus 100 includes a back electromotive force (BEMF) detection circuit 10, a PWM signal generating circuit 12, a driving signal synthesizing circuit 14, a driving circuit 16, a rotational speed signal generating circuit 20, a rotor position detection circuit 38, and an internal start-up synchronization signal generating unit 40.

The PWM signal generating circuit 12 outputs a PWM control signal S2 that is pulse-width modulated according to the target torque for the fan motor 6. The PWM signal generating circuit 12 may receive, as an input signal from outside the driving apparatus 100, a control signal S1 that is pulse width modulated according to the motor target torque, and may output the control signal S1 thus received as the PWM control signal S2. Also, the PWM signal generating circuit 12 may receive an analog voltage that corresponds to the ambient temperature Ta acquired using a thermistor or the like, and may generate such a PWM control signal S2 having a duty ratio that corresponds to the analog voltage thus received.

Alternatively, the PWM signal generating circuit 12 may receive a digital signal which indicates the duty ratio from a host processor such as a CPU or the like, and may generate such a PWM control signal S2 according to the digital signal thus received.

The BEMF detection circuit 10 is configured to compare each of the back electromotive force voltages $V_U$, $V_V$, and $V_W$, which develop at the respective terminal of the U-phase coil $L_U$, the V-phase coil $L_V$, and the W-phase coil $L_W$, with an intermediate-point voltage $V_{COM}$ that develops at a common connection node N1 that connects these three coils, and to generate a rotation detection signal S3 which is asserted for every predetermined electrical angle of 60 degrees. For example, the BEMF detection circuit 10 includes comparators (not shown) respectively provided to the U-phase coil, V-phase coil, and W-phase coil. Each comparator is configured to compare the coil voltage (back electromotive force voltage) $V_U$, $V_V$, or $V_W$, that occurs at one terminal of the corresponding phase coil with the intermediate-point voltage $V_{COM}$, and to generate a signal which indicates the comparison result. By logically combining the signals output from the respective comparators, such an arrangement generates the rotation detection signal S3.

The driving signal synthesizing circuit 14 is configured to receive the rotation detection signal S3 and the PWM control signal S2, and to combine the signals thus received so as to generate a driving control signal S4 (sensorless driving operation).

The driving circuit 16 applies a driving voltage to one terminal of each of the coils $L_U$, $L_V$, and $L_W$, according to the driving control signal S4. The driving circuit 16 may BTL drive the fan motor 6, or may PWM drive the fan motor 6 according to the control signal S1.

The rotational speed signal generating circuit 20 is configured to generate a rotational speed signal FG that transits with every predetermined 180-degree mechanical angle (motor angle) with respect to the fan motor 6, i.e., every time the fan motor 6 rotates a half-turn, and to output the rotational speed signal FG thus generated via an FG terminal.

The above is the basic configuration of the driving apparatus 100. Next, description will be made regarding a configuration of the driving apparatus 100 configured to start up the fan motor 6.

The rotor position detection circuit 38 is configured to detect the position of the rotor of the fan motor 6 by means of inductive sensing, and to generate a rotor position detection signal S10 which indicates the position of the rotor. In the position detection mode, the driving signal synthesizing circuit 14 generates the driving control signal S4 based upon the rotor position detection signal S10. The configuration and the signal processing operation of the rotor position detection circuit 38 are not restricted in particular. For example, techniques described in Japanese Patent Application Laid Open No. 2004-104846, or the pamphlet International Publication WO 2005/083876 can be employed.

The internal start-up synchronization signal generating unit 40 is configured to generate an internal forced synchronization signal SYNC2 having a predetermined frequency. For example, the internal start-up synchronization signal generating unit 40 may include a ring oscillator or an oscillator having a different configuration.

Figure 2:
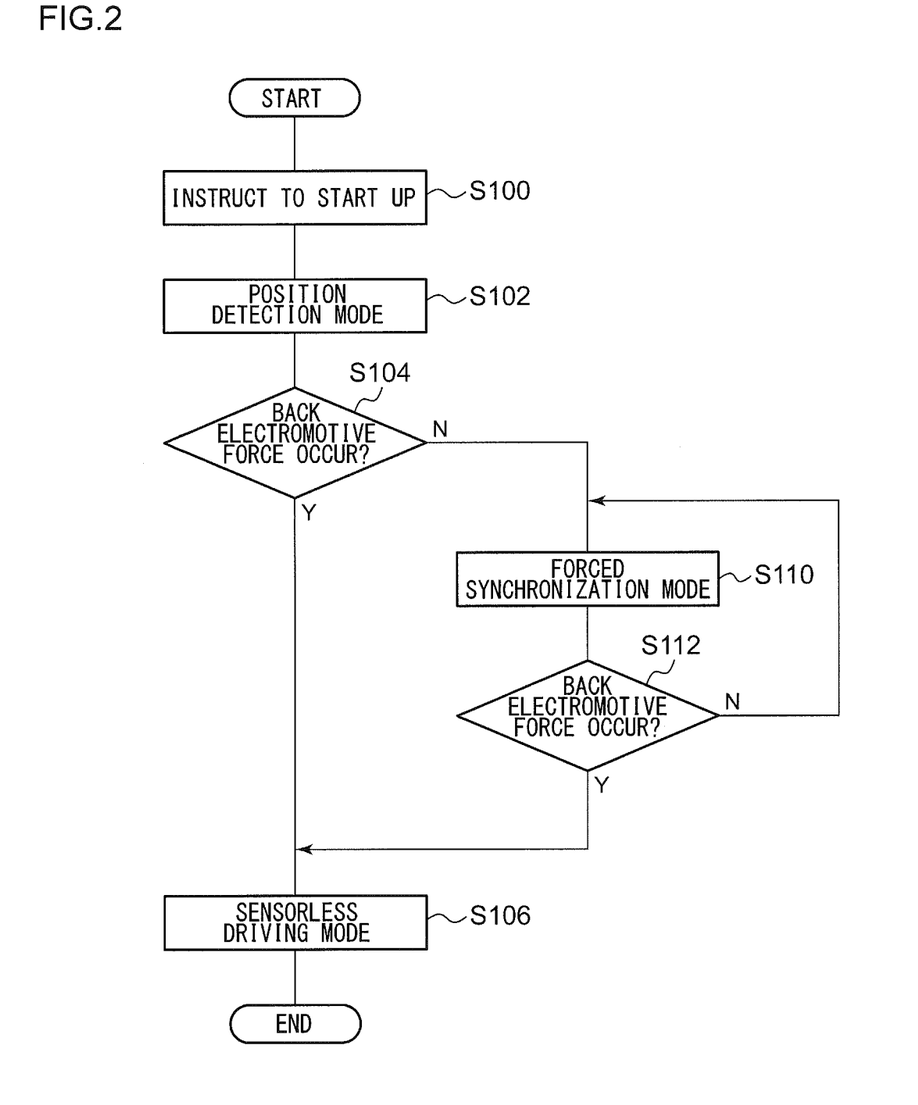
FIG. 2 is a flowchart which shows an operation of starting up the driving apparatus shown in FIG. 1.

FIG. 2 is a flowchart which shows the operation when the driving apparatus 100 shown in FIG. 1 is started up. When a power supply for an IC (driving apparatus 100) is turned on, which is an instruction to start up the fan motor 6 (S100), the mode transits to the position detection mode (S102). In the position detection mode, the rotor position detection circuit 38 detects the position of the rotor in the stationary state, and the driving signal synthesizing circuit 14 generates the driving control signal S4 based upon the rotor position detection signal S10. As a result of the driving operation in the rotor position detection mode, the fan motor 6 is rotated in a desired direction. In this stage, when the back electromotive force voltage, i.e., the rotation detection signal S3, is generated (YES in S104), the mode transits to the sensorless driving mode (S106).

When the back electromotive force voltage does not occur after the driving operation is performed in the position detection mode (NO in S104), the mode transits to a forced synchronization mode (S110). In the forced synchronization mode, the driving signal synthesizing circuit 14 sequentially advances the driving phase of the fan motor 6 in synchronization with an internal forced synchronization signal SYNC2 regardless of the position of the rotor, so as to attempt to rotationally drive the fan motor 6. This operation is repeatedly performed until the back electromotive force voltage occurs (NO in S112). When the back electromotive force voltage occurs as a result of the driving operation in the forced synchronization mode, the mode transits to the sensorless driving mode (S106).

Figure 3A:
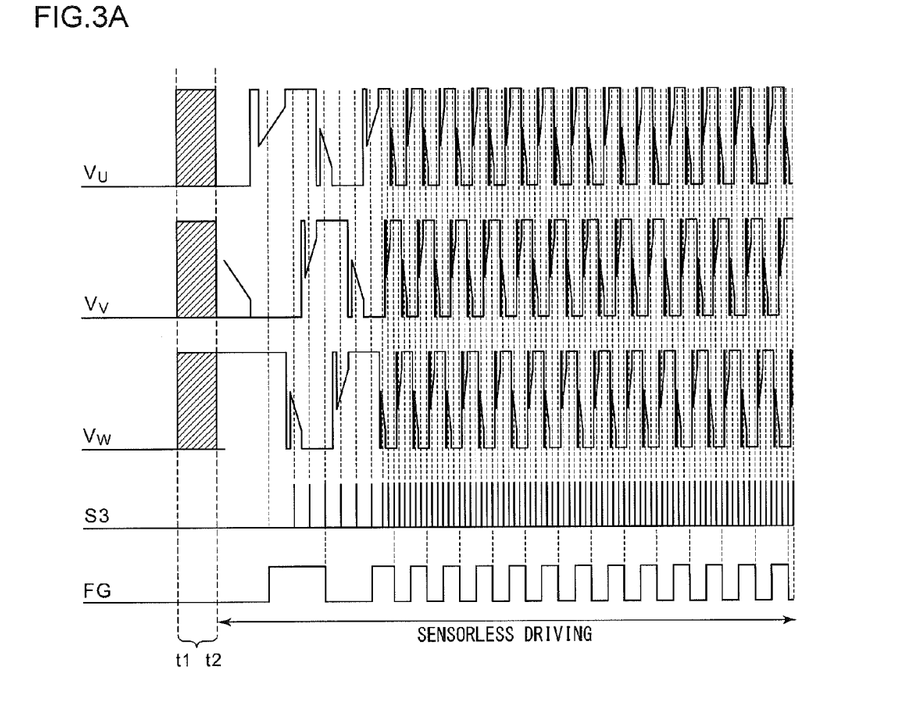
FIG. 3A is a waveform diagram showing waveforms in a case in which the mode immediately transits from a position detection mode to a sensorless driving mode.
Figure 3B:
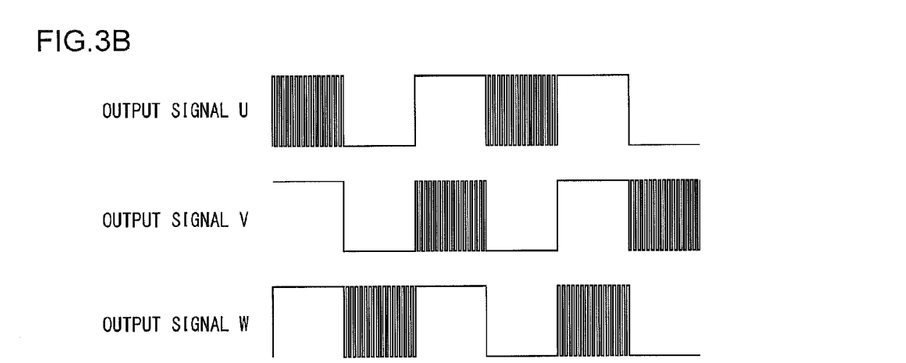
FIG. 3B is a diagram showing an example of a driving signal sequence in the position detection mode.
Figure 4:
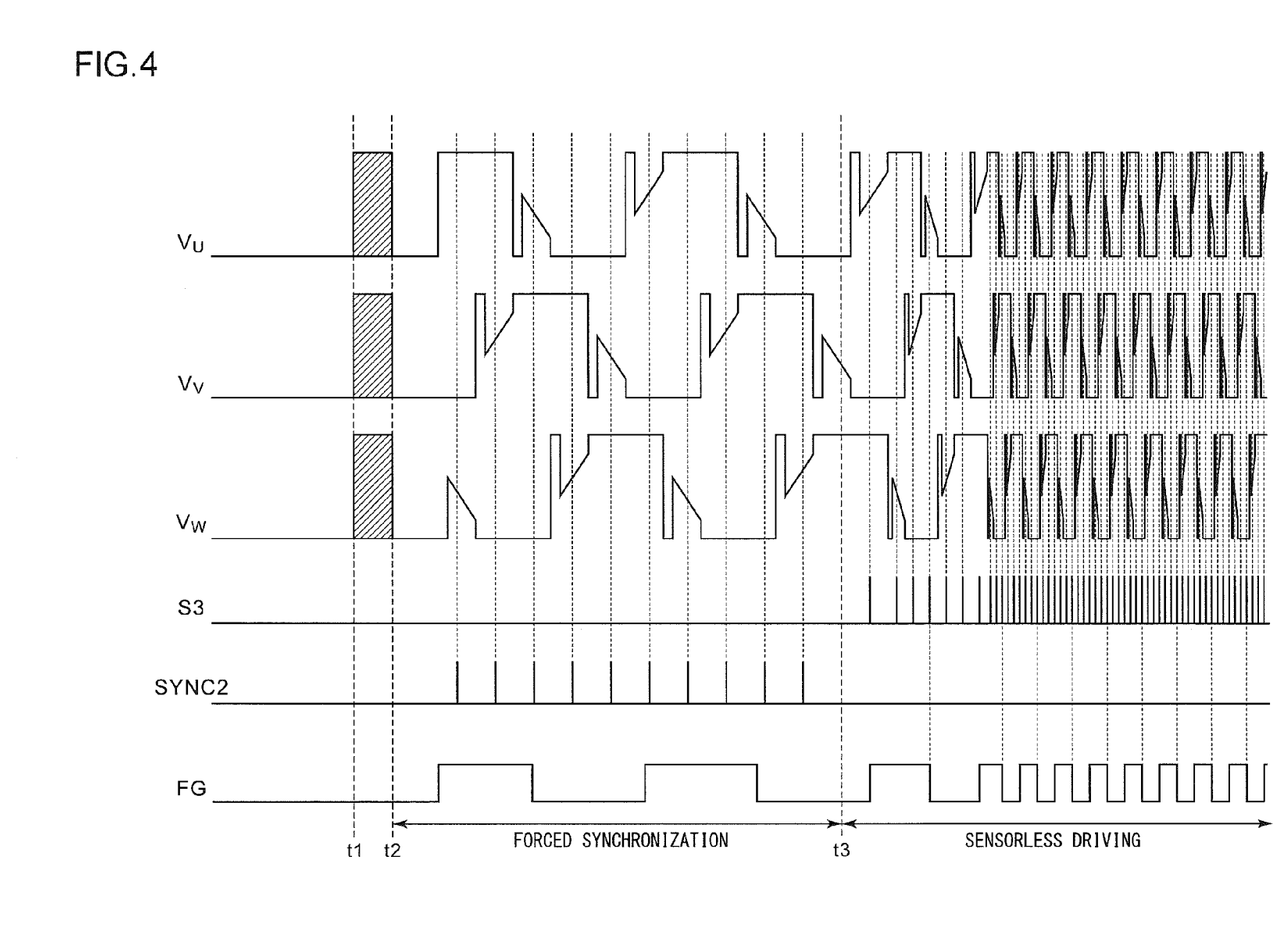
FIG. 4 is a time chart which shows the operation of the driving apparatus shown in FIG. 1.

The above is the configuration of the driving apparatus 100. Next, description will be made regarding the operation thereof. FIGS. 3A and 3B and FIG. 4 are time charts each showing the operation of the driving apparatus 100 shown in FIG. 1.

FIG. 3A shows the waveform when the mode immediately transits from the position detection mode to the sensorless driving mode. FIG. 3B shows an example of a sequence of the driving signal in the position detection mode. In the rotor position detection period from the time point t1 until the time point t2, the driving signals $V_U$ through $V_W$ shown in FIG. 3B, which are used in the position detection, are applied to the fan motor 6. The driving signals $V_U$ through $V_W$ do not cause rotation of the fan motor 6, but lead to change in the intermediate point voltage $V_{COM}$. The rotor position detection circuit 38 detects the rotor position based upon the change in the intermediate point voltage $V_{COM}$, and outputs the rotor position detection signal S10 which indicates the rotor position. The driving signal synthesizing circuit 14 stores a start-up logical pattern for each value of the rotor position detection signal S10, and generates the driving control signal S4 that corresponds to the rotor position detection signal S10. As a result, immediately after the fan motor 6 starts to rotate, the rotation detection signal S3 is generated. After the time point t2, the mode is switched to the sensorless driving mode in which the driving operation is performed according to the rotation detection signal S3.

FIG. 4 shows a case in which the mode transits from the position detection mode to the sensorless driving mode via the forced synchronization mode. When the rotation detection signal S3 does not occur after the driving operation is performed in the position detection mode during a period from the time point t1 until the time point t2, the operation is switched to the driving operation performed in the forced synchronization mode. When the back electromotive force voltage occurs after the time point t3, the operation is switched to the sensorless driving operation which is performed according to the rotation detection signal S3.

The above is the operation of the driving apparatus 100.

The position detection mode provides an advantage of stabilizing the start-up time for the fan motor 6. However, this mode can only be applied to limited kinds of fan motors among the various kinds of fan motors that can be employed as the fan motor 6, i.e., it has a disadvantage of poor versatility. First, the driving apparatus 100 shown in FIG. 1 attempts to start up the fan motor 6 in the position detection mode. If the driving apparatus 100 succeeds in starting up the fan motor 6, the fan motor 6 can be stably rotated. Even if the driving apparatus 100 fails to start up the fan motor 6 in the position detection mode, such an arrangement is capable of assisting the start-up operation of the fan motor 6 in the forced synchronization mode which is prepared as an auxiliary start-up mode. Thus, such an arrangement allows the fan motor 6 to be rotationally driven in a sure manner.

With conventional techniques, in order to generate such a forced synchronization signal, in some cases, instead of providing the internal start-up synchronization signal generating unit 40, the driving apparatus is configured to allow the designer of the cooling apparatus 4 to set the frequency of the forced synchronization signal as desired. Specifically, an oscillator is configured to charge/discharge a capacitor, and the capacitor is provided to the driving apparatus 100 as an external component. However, such a configuration requires a terminal (frequency setting terminal) via which the capacitor is connected, leading to a problem in that the package size of the driving apparatus 100 becomes larger. Furthermore, such an arrangement requires such an external capacitor, leading to a problem in that the size of the cooling apparatus 4 becomes larger.

In contrast, the driving apparatus 100 shown in FIG. 1 uses both the position detection mode and the forced synchronization mode. Thus, such an arrangement is capable of rotating the fan motor 6 without a need to change the frequency of the forced synchronization signal. Such an arrangement does not require the aforementioned capacitor, thereby providing an advantage of allowing the driving apparatus 100 to be formed with a reduced size. Alternatively, because the driving apparatus 100 does not require such a terminal (frequency setting terminal) for connecting such a capacitor, such an external terminal can be used as a different function terminal. For example, such an arrangement may include a terminal via which a control signal that indicates the rotation direction (normal/reverse) for the fan motor 6 is input. In this case, the driving signal synthesizing circuit 14 should have an additional function for switching the sequence of the driving control signal S4 according to the rotation direction thus indicated.

As described above, the driving apparatus 100 shown in FIG. 1 has the versatility to allow various kinds of sensorless fan motors to be started up.

Furthermore, the driving apparatus 100 shown in FIG. 1 has the following function. When the control signal S1 is lower than a predetermined minimum duty ratio $D_{MIN}$ in the start-up operation, the PWM signal generating circuit 12 sets the duty ratio of the PWM control signal S2 to the minimum duty ratio $D_{MIN}$ during a given start-up period, following which the PWM signal generating circuit 12 sets the duty ratio of the PWM control signal S2 to a value indicated by the control signal S1. For example, the minimum duty ratio $D_{MIN}$ is set to be on the order of 50%.

Figure 5:
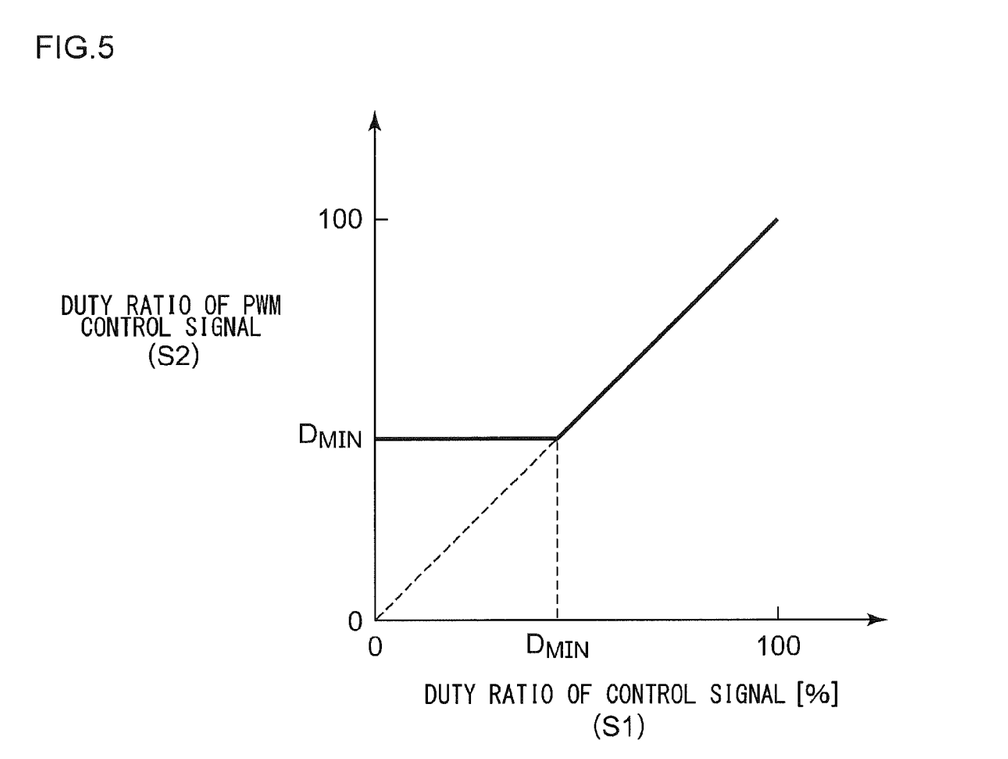
FIG. 5 is a graph showing the input/output relation for a PWM signal generating circuit.

FIG. 5 is a graph which shows the input/output relation for the PWM signal generating circuit 12. The horizontal axis represents the duty ratio indicated by the control signal S1, and the vertical axis represents the duty ratio of the PWM control signal S2 during a given start-up period from the beginning of the start-up.

With such a function, when the duty ratio indicated by the control signal S1 is excessively low in the start-up operation, such an arrangement is capable of driving the fan motor 6 with a minimum duty ratio, thereby compensating for the shortfall in the torque. On the other hand, when the control signal S1 indicates a sufficiently high duty ratio, the fan motor 6 is driven with the duty ratio indicated by the control signal S1, thereby stabilizing the rotational speed of the fan motor 6 to a target rotational speed in a short period of time.

Description has been made in the first embodiment regarding an arrangement in which the cooling apparatus 4 mounted on an electronic device is configured to cool a CPU. However, the application of the present invention is not restricted to such an arrangement. Rather, the present invention can be applied to various kinds of applications configured to cool a heating component. Furthermore, the use of the driving apparatus 100 according to the present embodiment is not restricted to an arrangement configured to drive a fan motor. Also, the present invention can be applied to driving various kinds of motors.

Second Embodiment

When a sensorless motor is started up from a stationary state or in a rotational state in which the rotation is performed by inertial force or external force, in some cases, a method is used which is a so-called forced synchronization driving method. With such a method, a synchronization signal having a predetermined frequency is generated, and the driving phase of the sensorless motor is sequentially switched according to the synchronization signal thus generated so as to attempt to start up the sensorless motor. When rotation is detected, the operation is switched to a normal sensorless driving operation which is performed based upon the back electromotive force voltage.

However, there are numerous kinds of sensorless motors used for cooling fans (which will also be referred to as "fan motors" hereafter), as compared with spindle motors used for magnetic disk drives. Furthermore, there is a tendency for there to be a great difference in the characteristics of the fan motor, such as the motor torque etc., depending on the device on which the fan motor is to be mounted.

Description will be made in the second embodiment regarding a driving apparatus having high versatility which is capable of stating up various kinds of sensorless fan motors.

Figure 6:
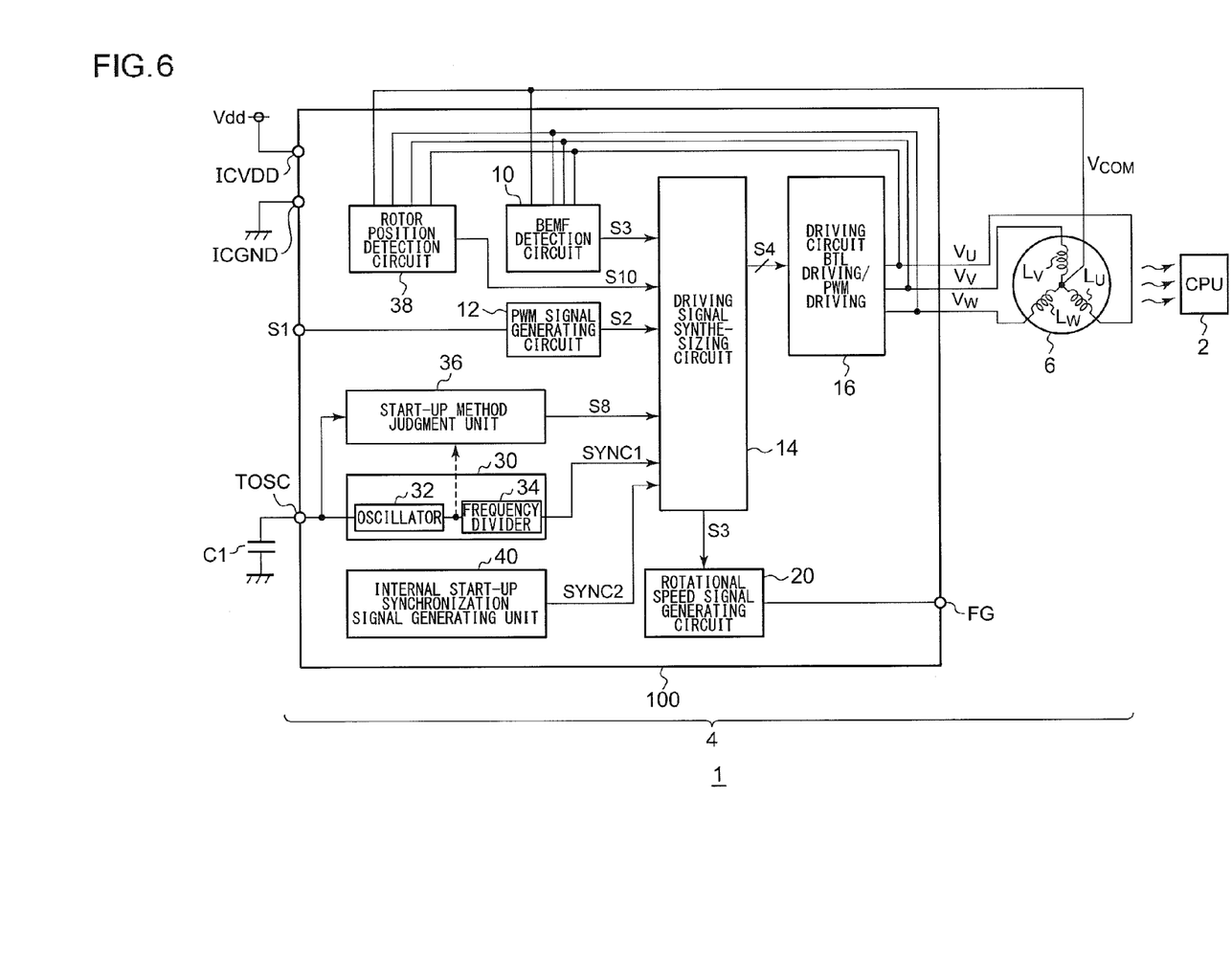
FIG. 6 is a block diagram which shows a configuration of an electronic device including a cooling apparatus according to a second embodiment.

First, description will be made with reference to FIG. 6 regarding the overall configuration of a driving apparatus 100 according to the second embodiment. The driving apparatus 100 is mounted on a cooling apparatus including a sensorless fan motor, and is configured to drive the fan motor. FIG. 6 is a block diagram which shows a configuration of an electronic device 1 including a cooling apparatus 4 according to the second embodiment.

The electronic device 1 is configured as a computer such as a personal computer, workstation, etc., or a consumer electronics device such as a refrigerator, TV, etc., and includes a component to be cooled, e.g., a CPU 2. The cooling apparatus 4 is configured to cool the CPU 2 by ventilating it.

The cooling apparatus 4 includes a driving apparatus 100 and a fan motor 6. The fan motor 6 is arranged in the vicinity of the CPU 2 to be cooled. The driving apparatus 100 is configured to drive the fan motor 6 according to an input control signal (which will simply be referred to as the "control signal" hereafter) S1 for indicating the torque (rotational speed) for the fan motor 6. The cooling apparatus 4 is commercially available as a module.

The fan motor 6 is configured as a three-phase AC motor including coils, i.e., a U-phase coil $L_U$, a V-phase coil $L_V$, and an W-phase coil $L_W$, which are star-connected, and an unshown permanent magnet. Description will be made in the present embodiment regarding an arrangement in which the fan motor 6 has four poles.

The driving apparatus 100 is configured as a function IC (Integrated Circuit) integrated on a single semiconductor substrate. The power supply voltage is supplied to a power supply terminal ICVDD, and the ground voltage is supplied to a ground terminal ICGND.

The driving apparatus 100 includes a back electromotive force (BEMF) detection circuit 10, a PWM signal generating circuit 12, a driving signal synthesizing circuit 14, a driving circuit 16, a rotational speed signal generating circuit 20, a start-up synchronization signal generating unit 30, a start-up method judgment unit 36, a rotor position detection circuit 38, an internal start-up synchronization signal generating unit 40, and a frequency setting terminal (which will be referred to as the "TOSC terminal").

The PWM signal generating circuit 12 outputs a PWM control signal S2 that is pulse-width modulated according to the target torque for the fan motor 6. The PWM signal generating circuit 12 may receive, as an input signal from outside the driving apparatus 100, a control signal S1 that is pulse width modulated according to the motor target torque, and may output the control signal S1 thus received as the PWM control signal S2. Also, the PWM signal generating circuit 12 may receive an analog voltage that corresponds to the ambient temperature Ta acquired using a thermistor or the like, and may generate such a PWM control signal S2 having a duty ratio that corresponds to the analog voltage thus received. Alternatively, the PWM signal generating circuit 12 may receive a digital signal which indicates the duty ratio from a host processor such as a CPU or the like, and may generate such a PWM control signal S2 according to the digital signal thus received.

The BEMF detection circuit 10 is configured to compare each of the back electromotive force voltages $V_U$, $V_V$, and $V_W$, which develop at the respective terminal of the U-phase coil $L_U$, the V-phase coil $L_V$, and the W-phase coil $L_W$, with an intermediate-point voltage $V_{COM}$ that develops at a common connection node that connects these three coils, and to generate a rotation detection signal S3 which is asserted for every predetermined electrical angle of 60 degrees. For example, the BEMF detection circuit 10 includes comparators (not shown) respectively provided to the U-phase coil, V-phase coil, and W-phase coil. Each comparator is configured to compare the coil voltage (back electromotive force voltage) $V_U$, $V_V$, or $V_W$, that occurs at one terminal of the corresponding phase coil with the intermediate-point voltage $V_{COM}$, and to generate a signal which indicates the comparison result. By logically combining the signals output from the respective comparators, such an arrangement generates the rotation detection signal S3.

The driving signal synthesizing circuit 14 is configured to receive the rotation detection signal S3 and the PWM control signal S2, and to combine the signals thus received so as to generate a driving control signal S4 (sensorless driving operation).

The driving circuit 16 applies a driving voltage to one terminal of each of the coils $L_U$, $L_V$, and $L_W$, according to the driving control signal S4. The driving circuit 16 may BTL drive the fan motor 6, or may PWM drive the fan motor 6 according to the control signal S1.

The rotational speed signal generating circuit 20 is configured to generate a rotational speed signal FG that transits with every predetermined 180-degree mechanical angle (motor angle) with respect to the fan motor 6, i.e., every time the fan motor 6 rotates a half-turn, and to output the rotational speed signal FG thus generated via an FG terminal.

The above is the basic configuration of the driving apparatus 100. Next, description will be made regarding a configuration of the driving apparatus 100 configured to start up the fan motor 6.

The driving apparatus 100 is configured to be capable of starting up the fan motor 6 in one mode selected from among the following three modes.

1. First Forced Synchronization Mode

The driving phase is sequentially switched in synchronization with a synchronization signal (external forced synchronization signal SYNC1) having a frequency that can be set by the user, so as to start up the fan motor 6.

2. Second Forced Synchronization Mode

The driving phase is sequentially switched in synchronization with a synchronization signal (internal forced synchronization signal SYNC2) having a frequency that is set beforehand in the driving apparatus 100, so as to start up the fan motor 6.

3. Position Detection Mode

The position of the rotor of the fan motor 6 in the stationary state is detected, and the fan motor 6 is started up according to a sequence that is suitable for the position thus detected.

The TOSC terminal is configured such that an external capacitor C1 can be connected via the TOSC terminal. Whether or not such a capacitor C1 is to be connected to the TOSC terminal is determined by the designer of the cooling apparatus 4 or the electronic device 1.

In a state in which the capacitor C1 is connected to the TOSC terminal, the start-up synchronization signal generating unit 30 charges and discharges the capacitor C1 so as to generate the external forced synchronization signal SYNC1 having a frequency that corresponds to the capacitance of the capacitor C1. For example, the start-up synchronization signal generating unit 30 includes an oscillator 32 and a frequency divider 34. The oscillator 32 repeats charging/discharging of the capacitor C1 so as to generate a cyclic signal, having a triangular waveform or a sawtooth waveform, at the TOSC terminal. Furthermore, the oscillator 32 generates a pulse signal that is synchronous with the cyclic signal thus generated. Such an oscillator 32 may preferably be configured using known techniques, and the configuration thereof is not restricted in particular. The frequency divider 34 divides, as necessary, the frequency of the pulse signal thus generated by the oscillator 32 so as to generate the external forced synchronization signal SYNC1. When the capacitor C1 is not connected, the external forced synchronization signal SYNC1 is not generated.

In the first forced synchronization mode, the driving signal synthesizing circuit 14 generates the driving control signal S4 based upon the external forced synchronization signal SYNC1.

The internal start-up synchronization signal generating unit 40 generates the internal forced synchronization signal SYNC2 having a predetermined frequency that is not dependent on the capacitance of the capacitor C1. For example, the internal start-up synchronization signal generating unit 40 may include a ring oscillator or an oscillator having a different configuration. In the second forced synchronization mode, the driving signal synthesizing circuit 14 generates the driving control signal S4 based upon the internal forced synchronization signal SYNC2.

The rotor position detection circuit 38 is configured to detect the position of the rotor of the fan motor 6 by means of inductive sensing, and to generate a rotor position detection signal S10 which indicates the position of the rotor. In the position detection mode, the driving signal synthesizing circuit 14 generates the driving control signal S4 based upon the rotor position detection signal S10. The configuration and the signal processing operation of the rotor position detection circuit 38 are not restricted in particular. For example, techniques described in Japanese Patent Application Laid Open No. 2004-104846 or techniques described in the pamphlet International Publication WO 2005/083876 can be employed.

The start-up method judgment unit 36 judges whether or not the capacitor C1 is connected to the TOSC terminal. The judgment method for judging whether or not the capacitor C1 is thus connected is not restricted in particular. For example, when the capacitor C1 is connected, the oscillator 32 outputs a pulse signal, and when the capacitor C1 is not connected, the oscillator 32 outputs a signal having a DC level. Accordingly, the start-up method judgment unit 36 judges whether or not the capacitor C1 is connected based upon the output of the oscillator 32.

A modification may be made in which the start-up method judgment unit 36 judges based upon the voltage at the TOSC terminal or the external forced synchronization signal SYNC1 whether or not the capacitor C1 is connected.

With the present embodiment, it is decided in advance that the TOSC terminal is to be fixed to the first voltage level (power supply voltage $V_{DD}$) or otherwise to the second voltage level (ground voltage $V_{GND}$) when the capacitor C1 is not connected to the TOSC terminal. When the capacitor C1 is not connected, the start-up method judgment unit 36 judges whether or not the TOSC terminal is pulled up (set to the power supply $V_{DD}$) or pulled down (set to the ground voltage $V_{GND}$).

The start-up method judgment unit 36 selects, based upon the state of the TOSC terminal, one start-up method from among the first forced synchronization mode, the second forced synchronization mode, and the position detection mode, and outputs, to the driving signal synthesizing circuit 14, a start-up method control signal S8 which indicates the mode thus selected. Specifically, when the start-up method judgment unit 36 detects a state in which the capacitor C1 is connected, the start-up method judgment unit 36 sets the mode to the first forced synchronization mode. When the capacitor C1 is not connected and the TOSC terminal is pulled up, the start-up method judgment unit 36 sets the mode to the second forced synchronization mode. When the capacitor C1 is not connected and the TOSC terminal is pulled down, the start-up method judgment unit 36 sets the mode to the position detection mode.

For example, when the electric potential at the TOSC terminal remains at the power supply voltage $V_{DD}$ for a predetermined judgment period (e.g., 2 ms), the start-up method judgment unit 36 sets the mode to the second forced synchronization mode. Furthermore, when the electric potential at the TOSC terminal remains at the ground voltage $V_{GND}$ for a predetermined judgment period (e.g., 2 ms), the start-up method judgment unit 36 sets the mode to the position detection mode.

That is to say, when the capacitor C1 is connected to the TOSC terminal, the driving signal synthesizing circuit 14 generates the driving control signal S4 based upon the external forced synchronization signal SYNC1. When the capacitor C1 is not connected to the TOSC terminal, the driving signal synthesizing circuit 14 generates the driving control signal S4 based upon a signal that differs from the external forced synchronization signal SYNC1, specifically, based upon the rotor position detection signal S10 or the internal forced synchronization signal SYNC2.

Figure 7:
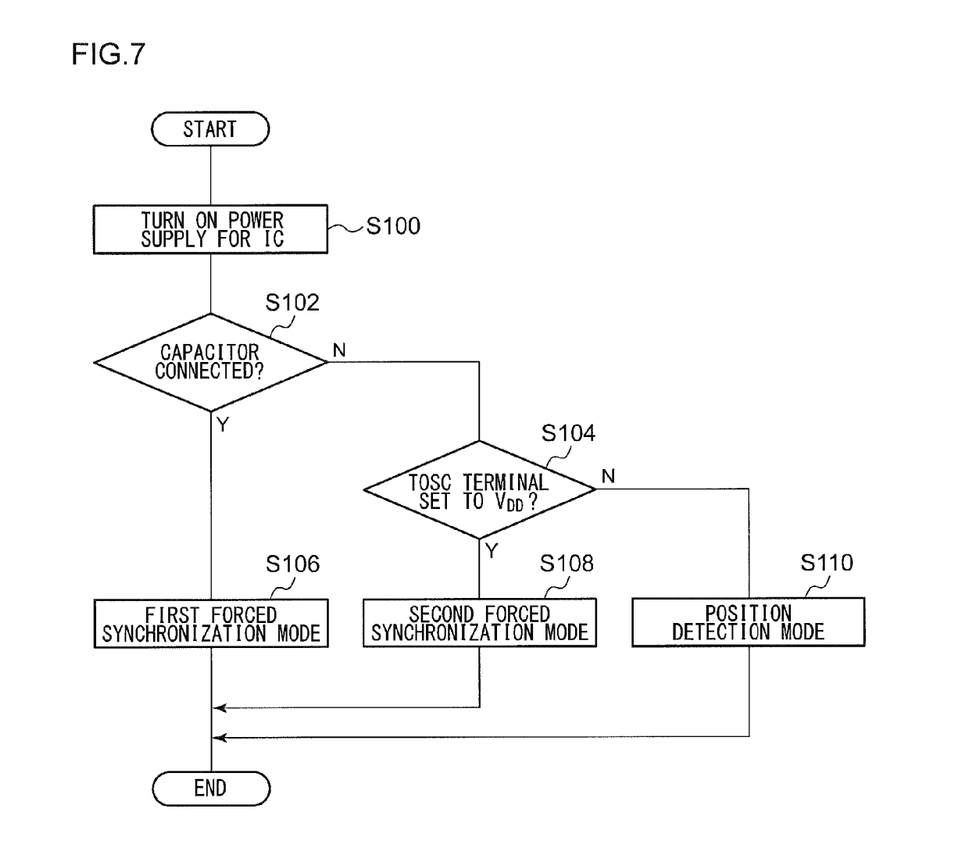
FIG. 7 is a flowchart which shows the operation of a driving apparatus shown in FIG. 6.

The above is the configuration of the driving apparatus 100. Next, description will be made regarding the operation of the driving apparatus 100. FIG. 7 is a flowchart which shows the operation of the driving apparatus 100. In a shutdown state or a standby state of the driving apparatus 100, the driving apparatus 100 is instructed to start up, i.e., an instruction is made to start to drive the fan motor 6 (S100). Upon reception of this instruction, the start-up method judgment unit 36 judges the state of the TOSC terminal, and selects the start-up mode based upon the judgment result (S102 and S104). When a capacitor is connected to the TOSC terminal (YES in S102), the first forced synchronization mode is selected (S106). When the power supply voltage $V_{DD}$ is supplied to the TOSC terminal (NO in S102 and YES in S104), the second forced synchronization mode is selected (S108). When the ground voltage $V_{GND}$ is supplied to the TOSC terminal (NO in S102 and NO in S104), the position detection mode is selected (S110).

1. First Forced Synchronization Mode (S106)

The designer of the cooling apparatus 4 or the electronic device 1 determines the optimum frequency of the external forced synchronization signal SYNC1 based upon the kind of fan motor 6, and connects the capacitor C1 having a capacitance configured to provide such an optimum frequency to the TOSC terminal.

When the start-up method judgment unit 36 detects the connection of the capacitor C1, the first forced synchronization mode is selected. As a result, the external forced synchronization signal SYNC1 having a frequency that corresponds to the capacitance of the capacitor C1 is generated, and the driving control signal S4 is generated based upon the external forced synchronization signal SYNC1, thereby driving the fan motor 6.

Figure 8:
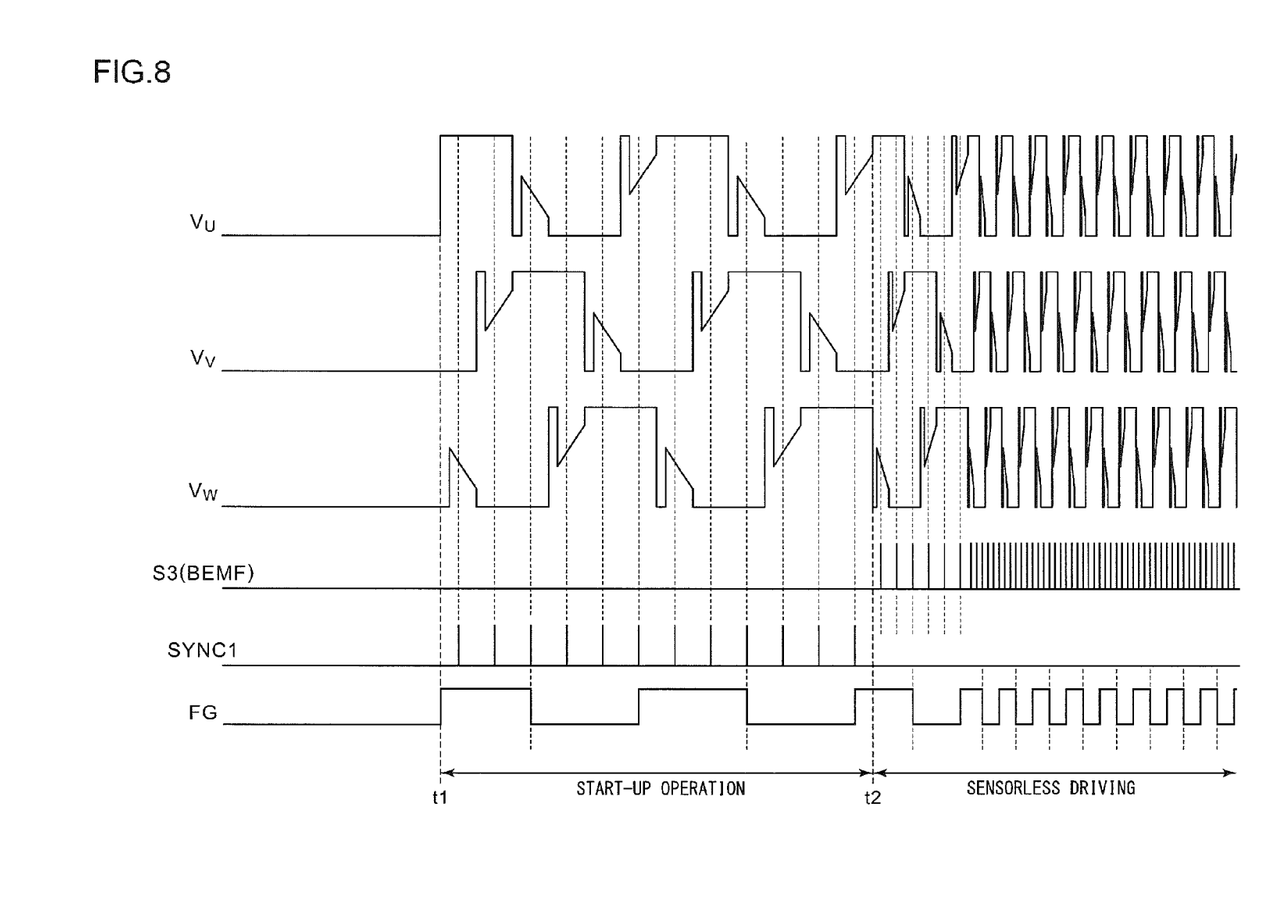
FIG. 8 is a time chart which shows the operation in a first forced synchronization mode.

FIG. 8 is a time chart which shows the operation in the first forced synchronization mode. During the start-up period from the time point t1 until the time point t2, the driving voltages $V_U$ through $V_W$ are generated according to the driving control signal S4 that is synchronous with the external forced synchronization signal SYNC1. After the fan motor 6 starts to rotate, back electromotive force voltage occurs at one terminal of each of the coils $L_U$ through $L_W$, and the rotation detection signal S3 is generated. After the time point t2, the operation transits to the sensorless driving operation performed according to the rotation detection signal S3.

2. Second Forced Synchronization Mode

The TOSC terminal is pulled up to the power supply voltage $V_{DD}$ by the designer. In this case, the start-up method judgment unit 36 sets the mode to the second forced synchronization mode. The time chart of the operation in the second forced synchronization mode is similar to that shown in FIG. 8. There is a difference between these two forced synchronization modes in that the internal forced synchronization signal SYNC2 having a predetermined frequency is used in the second forced synchronization mode instead of the external forced synchronization signal SYNC1.

3. Position Detection Mode

Figure 9A:
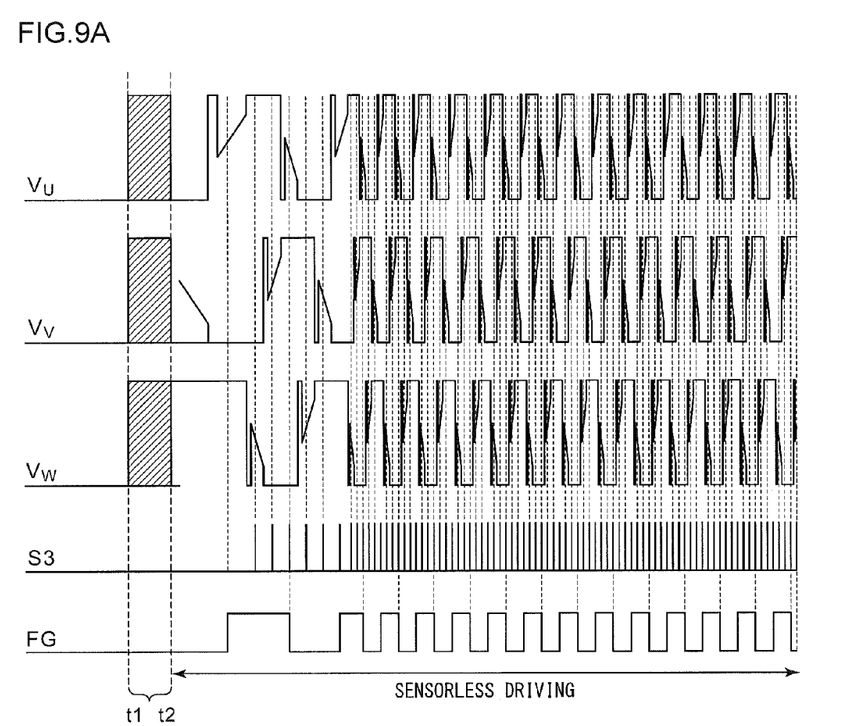
FIGS. 9A and 9B are time charts each showing the operation in the position detection mode.
Figure 9B:
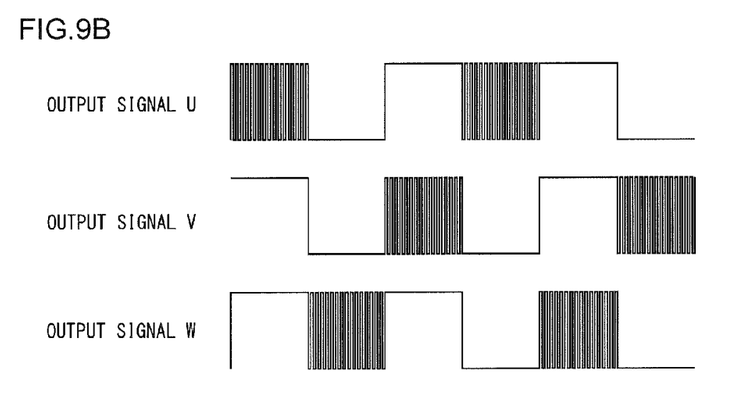

The designer pulls down the TOSC terminal to the ground voltage VGND. In this case, the start-up method judgment unit 36 sets the mode to the position detection mode. FIGS. 9A and 9B are time charts each showing the operation in the position detection mode. In the rotor position detection period from the time point t1 until the time point t2, the driving signals $V_U$ through $V_W$ shown in FIG. 9B, which are used in the position detection, are applied to the fan motor 6. The driving signals $V_U$ through $V_W$ do not cause rotation of the fan motor 6, but lead to change in the intermediate point voltage $V_{COM}$. The rotor position detection circuit 38 detects the rotor position based upon the change in the intermediate point voltage $V_{COM}$, and outputs the rotor position detection signal S10 which indicates the rotor position. The driving signal synthesizing circuit 14 stores a start-up logical pattern for each value of the rotor position detection signal S10, and generates the driving control signal S4 that corresponds to the rotor position detection signal S10. As a result, immediately after the fan motor 6 starts to rotate, the rotation detection signal S3 is generated. After the time point t2, the sensorless driving operation is performed according to the rotation detection signal S3.

The above is the operation of the driving apparatus 100.

The position detection mode provides an advantage of providing a stabilized start-up time of the fan motor 6. However, this mode has a disadvantage in that can only be applied to a limited range of kinds of fan motors, i.e., it has a disadvantage of poor versatility. Accordingly, in a case in which the fan motor 6 to be employed can be started up in the position detection mode, the user should pull down the TOSC terminal to the ground voltage $V_{GND}$. This allows the fan motor 6 to start up stably. Furthermore, in this case, there is no need to provide the external capacitor C1, thereby providing a reduced size of the cooling apparatus 4. There is a particularly great demand for a fan motor driving apparatus to have a reduced size as compared with other driving apparatuses for other kinds of motors. Thus, such an advantage of a reduced size of the fan motor driving apparatus is very important.

The start-up operation in the second forced synchronization mode has an unstable start-up time as compared with that in the position detection mode. Furthermore, the second forced synchronization mode has a disadvantage in that it can only be applied to a limited range of kinds of fan motors 6, although it has improved versatility as compared with the position detection mode. Accordingly, in a case in which the fan motor 6 to be employed cannot be started up in the position detection mode, but it can be started up in the second forced synchronization mode, the user should pull up the TOSC terminal to the power supply voltage $V_{DD}$. In this case, there is no need to provide the external capacitor C1, thereby providing a reduced size of the cooling apparatus 4.

In a case in which the fan motor 6 can be started up in neither the position detection mode nor the second forced synchronization mode, or otherwise in a case in which a very long start-up time is required in either of these modes, the user should connect the capacitor C1 having an optimum capacitance to the TOSC terminal. This leads to a disadvantage of an increased number of components. However, such an arrangement is capable of forcibly starting up the fan motor 6 to be driven, in synchronization with its optimum frequency. Thus, such an arrangement allows various kinds of fan motors 6 having various kinds of characteristics to be driven.

As described above, the driving apparatus 100 shown in FIG. 6 has the versatility to allow various kinds of sensorless fan motors to be started up.

Description has been made regarding the present invention with reference to the embodiments. The above-described embodiment has been described for exemplary purposes only, and is by no means intended to be interpreted restrictively. Rather, it can be readily conceived by those skilled in this art that various modifications may be made by making various combinations of the aforementioned components or processes, which are also encompassed in the technical scope of the present invention. Description will be made below regarding such modifications.

Description has been made in the embodiment regarding an arrangement configured to be switchable between three modes. However, the present invention is not restricted to such an arrangement.

Modification 1

A first modification may be made configured to be switchable between the first forced synchronization mode and the position detection mode. That is to say, such a first modification has a configuration obtained by omitting the internal start-up synchronization signal generating unit 40 from the driving apparatus 100 shown in FIG. 6. Furthermore, the start-up method judgment unit 36 judges whether or not the capacitor C1 is connected to the TOSC terminal. When the capacitor C1 is connected, the start-up method judgment unit 36 sets the mode to the first forced synchronization mode, and when the capacitor C1 is not connected, the start-up method judgment unit 36 sets the mode to the position detection mode.

The first modification is configured to be switchable between the position detection mode and the first forced synchronization mode. Thus, such an arrangement is capable of driving particular kinds of fan motors 6 in the position detection mode without a need to connect the capacitor C1. Even if a motor to which the position detection mode cannot be applied is employed as the fan motor 6, by connecting the capacitor C1 having an optimum capacitance, such an arrangement is capable of starting up such a fan motor 6.

Modification 2

A second modification may be configured to be switchable between the first forced synchronization mode and the second forced synchronization mode. That is to say, the second modification is obtained by omitting the rotor position detection circuit 38 from the driving apparatus 100 shown in FIG. 6. Furthermore, the start-up method judgment unit 36 judges whether or not the capacitor C1 is connected to the TOSC terminal. When the capacitor C1 is connected, the start-up method judgment unit 36 sets the mode to the first forced synchronization mode, and when the capacitor C1 is not connected, the start-up method judgment unit 36 sets the mode to the second forced synchronization mode.

By configuring the driving apparatus 100 to be switchable between the first forced synchronization mode and the second forced synchronization mode, such an arrangement allows particular kinds of fan motors 6 to be started up in the second forced synchronization mode without a need to connect the capacitor C1. Even if a fan motor to which the second forced synchronization mode cannot be applied is employed as the fan motor 6, by connecting the capacitor C1 having an optimum capacitance, such an arrangement is capable of starting up such a fan motor 6.

Description has been made in the embodiment regarding an arrangement in which the cooling apparatus 4 mounted on an electronic device is configured to cool a CPU. However, the application of the present invention is not restricted to such an arrangement. Rather, the present invention can be applied to various kinds of applications configured to cool a heating component. Furthermore, the use of the driving apparatus 100 according to the present embodiment is not restricted to an arrangement configured to drive a fan motor. Also, the present invention can be applied to driving various kinds of motors.

While the preferred embodiments of the present invention have been described using specific terms, such description is for illustrative purposes only, and it is to be understood that changes and variations may be made without departing from the spirit or scope of the appended claims.

What is claimed is:

1. A driving apparatus for a sensorless fan motor including a plurality of coils, the driving apparatus comprising:
  a back electromotive force detection circuit configured to compare, in a state in which the sensorless fan motor is rotating, a back electromotive force voltage that occurs at one terminal of each of the plurality of coils with an intermediate-point voltage that occurs at a common connection node at which the plurality of coils are connected together, and to generate a rotation detection signal which indicates a comparison result;

a rotor position detection circuit configured to detect, in a state in which the sensorless fan motor is stopped, the position of a rotor of the sensorless fan motor, and to generate a rotor position detection signal which indicates the position of the rotor;

a forced synchronization signal generating unit configured to generate a forced synchronization signal having a predetermined frequency;

a driving signal synthesizing circuit configured to generate a driving control signal for driving the sensorless fan motor; and a driving circuit configured to drive the sensorless fan motor according to the driving control signal, wherein the driving signal synthesizing circuit is configured to generate the driving control signal according to the rotor position detection signal upon reception of an instruction to start up the sensorless fan motor, and thus, (1) when the back electromotive force voltage occurs, the sensorless driving operation is started, in which the driving control signal is generated based upon the rotation detection signal, and (2) when the back electromotive force voltage does not occur, the driving control signal is generated based upon the forced synchronization signal, and following which, when the back electromotive force occurs, a sensorless driving operation is performed in which the driving control signal is generated based upon the rotation detection signal.

2. A driving apparatus according to claim 1, further comprising a pulse width modulation signal generating circuit configured to receive, from an external circuit, a control signal which indicates the duty ratio for pulse width driving of the sensorless fan motor, and to generate a pulse width modulation control signal having a duty ratio indicated by the control signal, wherein, when the duty ratio indicated by the control signal is lower than a predetermined minimum duty ratio, the pulse width modulation signal generating unit sets the duty ratio of the pulse width modulation control signal to the minimum duty ratio during a given start-up period from the beginning of the start-up, following which the duty ratio of the pulse width modulation control signal is set to a value indicated by the control signal.

3. A cooling apparatus comprising:
a sensorless fan motor; and
a motor driving apparatus according to claim 1, configured to drive the sensorless fan motor.

4. An electronic device comprising:
a calculation processing apparatus; and
a cooling apparatus according to claim 3, configured to cool the calculation processing apparatus.

5. A start-up method for a sensorless fan motor including a plurality of coils, the start-up method comprising:

comparing, in a state in which the sensorless fan motor is rotating, a back electromotive force voltage that occurs at one terminal of each of the plurality of coils with an intermediate-point voltage that occurs at a common connection node at which the plurality of coils are connected together, and generating a rotation detection signal which indicates a comparison result;

detecting, in a state in which the sensorless fan motor is stopped, the position of a rotor of the sensorless fan motor, and generating a rotor position detection signal which indicates the position of the rotor;

generating a forced synchronization signal having a predetermined frequency;

generating a driving control signal for driving the sensorless fan motor; and driving the sensorless fan motor according to the driving control signal, wherein, upon reception of an instruction to start up the sensorless fan motor, the driving control signal is generated according to the rotor position detection signal, and thus, (1) when the back electromotive force voltage occurs, the sensorless driving operation is started, in which the driving control signal is generated based upon the rotation detection signal, and (2) when the back electromotive force voltage does not occur, the driving control signal is generated based upon the forced synchronization signal, and following which, when the back electromotive force occurs, the driving control signal is generated based upon the rotation detection signal.

6. A driving apparatus for a sensorless fan motor including a plurality of coils, the driving apparatus comprising:

a frequency setting terminal via which an external capacitor can be connected;

a start-up method judgment unit configured to judge whether or not the capacitor is connected to the frequency setting terminal;

a start-up synchronization signal generating unit configured to charge and discharge the capacitor in a state in which the capacitor is connected to the frequency setting terminal so as to generate an external forced synchronization signal having a frequency that corresponds to the capacitance of the capacitor;

a driving signal synthesizing circuit configured such that, when the start-up method judgment unit detects connection of the capacitor, the driving signal synthesizing circuit generates a driving control signal for starting up the sensorless fan motor based upon the external forced synchronization signal, and when the start-up method judgment unit detects that the capacitor is not connected, the driving signal synthesizing circuit generates the driving control signal based upon a signal that differs from the external forced synchronization signal; and a driving circuit configured to drive the sensorless fan motor according to the driving control signal.

7. A driving apparatus according to claim 6, further comprising an internal start-up synchronization signal generating unit configured to generate an internal forced synchronization signal having a predetermined frequency that is not dependent on the capacitance of the capacitor, wherein, when it is detected that the capacitor is not connected, the driving signal synthesizing circuit generates the driving control signal based upon the internal forced synchronization signal.

8. A driving apparatus according to claim 6, further comprising a rotor position detection circuit configured to detect the position of a rotor of the sensorless fan motor, and to generate a rotor position detection signal which indicates the position of the rotor, wherein, when the state in which the capacitor is not connected is detected, the driving signal synthesizing circuit generates the driving control signal based upon the rotor position detection signal.

9. A driving apparatus according to claim 6, further comprising an internal start-up synchronization signal generating unit configured to generate an internal forced synchronization signal having a predetermined frequency that is not dependent on the capacitance of the capacitor; and a rotor position detection circuit configured to detect the position of a rotor of the sensorless fan motor, and to generate a rotor position detection signal which indicates the position of the rotor, wherein, when the electric potential at the frequency setting terminal is fixed at a predetermined first level, the driving signal synthesizing circuit generates the driving control signal based upon the internal forced synchronization signal, and when the electric potential at the frequency setting terminal is fixed at a predetermined second level, the driving signal synthesizing circuit generates the driving control signal based upon the rotor position detection signal.

10. A cooling apparatus comprising:
a sensorless fan motor; and
a motor driving apparatus according to claim 6, configured to drive the sensorless fan motor.

11. An electronic device comprising:
a calculation processing apparatus; and
a cooling apparatus according to claim 10, configured to cool the calculation processing apparatus.

12. A start-up method for a sensorless fan motor including a plurality of coils, the start-up method comprising:
judging whether or not a capacitor is connected to a frequency setting terminal via which an external capacitor can be connected;
generating, in a state in which the capacitor is connected to the frequency setting terminal, an external forced synchronization signal having a frequency that corresponds to the capacitance of the capacitor, by charging and discharging the capacitor;
generating a driving control signal for starting up the sensorless fan motor based upon the external forced synchronization signal when the state in which a capacitor is connected to the frequency setting terminal is detected, and generating the driving control signal based upon a signal that differs from the external forced synchronization signal when the state in which a capacitor is not connected to the frequency setting terminal is detected; and
starting up the sensorless fan motor according to the driving control signal.

13. A start-up method according to claim 12, further comprising generating an internal forced synchronization signal having a predetermined frequency that is not dependent on the capacitance of the capacitor,
wherein, when the state in which the capacitor is not connected is detected, the driving control signal is generated based upon the internal forced synchronization signal.

14. A start-up method according to claim 12, further comprising detecting the position of a rotor of the sensorless fan motor, and generating a rotor position detection signal which indicates the position of the rotor,
wherein, when the state in which the capacitor is not connected is detected, the driving control signal is generated based upon the rotor position detection signal.

15. A start-up method according to claim 12, further comprising:
generating an internal forced synchronization signal having a predetermined frequency that is not dependent on the capacitance of the capacitor; and
detecting the position of a rotor of the sensorless fan motor, and generating a rotor position detection signal which indicates the position of the rotor,
wherein, when the electric potential at the frequency setting terminal is fixed at a predetermined first level, the driving control signal is generated based upon the internal forced synchronization signal, and when the electric potential at the frequency setting terminal is fixed at a predetermined second level, the driving control signal is generated based upon the rotor position detection signal.

* * * * *